United States Patent
Koulagi

(10) Patent No.: US 7,912,184 B2
(45) Date of Patent: Mar. 22, 2011

(54) VOICEMAIL TEST SYSTEM

(75) Inventor: Ravindra Koulagi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1366 days.

(21) Appl. No.: 11/165,799

(22) Filed: Jun. 24, 2005

(65) Prior Publication Data

US 2007/0003031 A1    Jan. 4, 2007

(51) Int. Cl.
*H04M 1/24* (2006.01)

(52) U.S. Cl. ............ 379/29.02; 370/241; 370/244; 370/250; 370/352; 370/353; 379/10.02; 379/21; 379/26.02; 379/29.08; 379/93.26; 702/122; 702/123; 702/124; 704/270; 704/275; 709/201

(58) Field of Classification Search .......... 379/1.01–31, 379/88.01–88.04, 9, 9.06, 10.02, 10.03, 15.03, 379/21, 26.01, 26.02, 29.02, 29.08, 93.26, 379/102.02; 370/241, 244, 250, 351–356; 702/121–126; 704/270, 275; 709/201–203

See application file for complete search history.

(56) References Cited

U.S. PATENT DOCUMENTS

| | | | | |
|---|---|---|---|---|
| 4,843,620 A * | 6/1989 | Hagedorn | ............ | 379/21 |
| 5,557,539 A * | 9/1996 | Fitch | ............ | 709/206 |
| 5,633,909 A * | 5/1997 | Fitch | ............ | 379/29.01 |
| 6,477,492 B1 * | 11/2002 | Connor | ............ | 704/236 |
| 6,516,051 B2 * | 2/2003 | Sanders | ............ | 379/10.03 |
| 6,724,865 B1 * | 4/2004 | Michel et al. | ............ | 379/88.18 |
| 6,940,820 B2 * | 9/2005 | Fang | ............ | 370/242 |
| 7,120,234 B1 * | 10/2006 | Quinn et al. | ............ | 379/88.04 |
| 7,194,068 B2 * | 3/2007 | Page | ............ | 379/1.02 |
| 7,308,079 B2 * | 12/2007 | Creamer et al. | ............ | 379/1.02 |
| 2005/0129194 A1 * | 6/2005 | Creamer et al. | ............ | 379/88.18 |
| 2006/0093094 A1 * | 5/2006 | Xing et al. | ............ | 379/1.02 |

* cited by examiner

*Primary Examiner* — Hemant Patel
(74) *Attorney, Agent, or Firm* — Haynes & Boone, LLP.

(57) ABSTRACT

A method and system for testing a Telephony User Interface is disclosed. Voice prompts of the Telephony User Interface are converted into tone prompts that are representative thereof. Each tone prompt can have a predetermined frequency and/or duration, so that it is readily recognizable by a Telephony User Interface tester. Thus, automation of the testing of Telephony User Interface is enhanced.

8 Claims, 3 Drawing Sheets

| Message | Frequency (Hz) | Duration (mSec) |
|---|---|---|
| To send this message with normal priority, press one. | 1,000 | 500 |
| To send this message with high priority, press two. | 1,000 | 1,000 |
| To listen to your message, press three. | 2,000 | 500 |
| To re-record your message, press four. | 2,000 | 1,000 |
| To cancel your message, press five. | 3,000 | 500 |
| Thank you. Your message has been sent. | 3,000 | 1,000 |
| Message cancelled. | 4,000 | 500 |
| Sorry. That is not a valid selection. Try again. | 4,000 | 1,000 |

VOICEMAIL TEST SYSTEM

TECHNICAL FIELD

The present invention relates generally to voicemail. The present invention relates more particularly to a method and system for testing a Telephony User Interface (TUI) of a voicemail system.

BACKGROUND

Voicemail systems for recording and playing voice messages over the telephone are well known. Voicemail system allows a caller to leave a voice message for a person when the person does not answer the telephone. Frequently, calls are not answered because the person receiving the call is already on the telephone, the telephone is turned off, or the person receiving the call is away from the telephone.

The recorded message can be listened to at a later time, when the recipient is available and willing to hear the message. Thus, voicemail systems provide a convenient way for people to communicate with one another.

The main interface of a voice mail system is the Telephony User Interface (TUI). A voicemail user, such as the person leaving a message or a person listening to a message, interacts with the TUI by pressing buttons on the keypad of a telephone so as to communicate dual-tone multiple-frequency (DTMF) tones to the TUI. These DTMF events are provided in response to voice prompts provided by the TUI. For example, the TUI may provide a voice prompt stating "Please enter you password." In response, the user may enter a password by pressing the appropriate buttons on the keypad of a telephone.

It is desirable to test such TUI's, so as to ensure that they respond properly to the DTMF events. Frequently, there are a plurality of voice prompts that can be provided by the TUI, as well as a plurality of possible DTMF responses to each voice prompt. It is important that the TUI respond properly to each of the possible DTMF events communicated thereto. However, manually testing a TUI, such as via the use of a telephone, is an undesirably labor intensive and costly task. Also, the regression testing of a TUI as and when new features are added to it becomes even more costly without some sort of test automation.

In view of the foregoing, it is desirable to provide a method and system for automating the testing TUI's, such that the testing is less labor intensive and costly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

One way to automate the testing of a Telephony User Interface (TUI) is to use voice recognition to determine what prompt was provided by the TUI and then to respond with the appropriate DTMF events. However, the use of voice recognition is undesirable because it increases the complexity (and consequently the cost) of the test system. Voice recognition uses more computational power than may be desired in computer based testing systems. Further, voice recognition may not as reliable as desired.

A method and system for automating the testing of TUI's without the undesirable use of voice recognition is disclosed herein. According to one or more embodiments of the present invention, voice prompts of the TUI are converted into tone prompts that are representative thereof. Each tone prompt can have a predetermined parameter, such as frequency and duration, so that the combination of the parameters is unique and it is readily recognizable by a TUI tester. Thus, the TUI tester does not need to use voice recognition in order to determine what voice prompt is being sent from the TUI. In this manner, automation of the testing of TUI's is substantially enhanced.

As those skilled in the art will appreciate, voice prompts are the voice based audio messages provided by a TUI to prompt a user to take actions such as pressing buttons on a touch tone telephone. Examples of such voice prompts are provided in FIG. 3.

Figure 1:
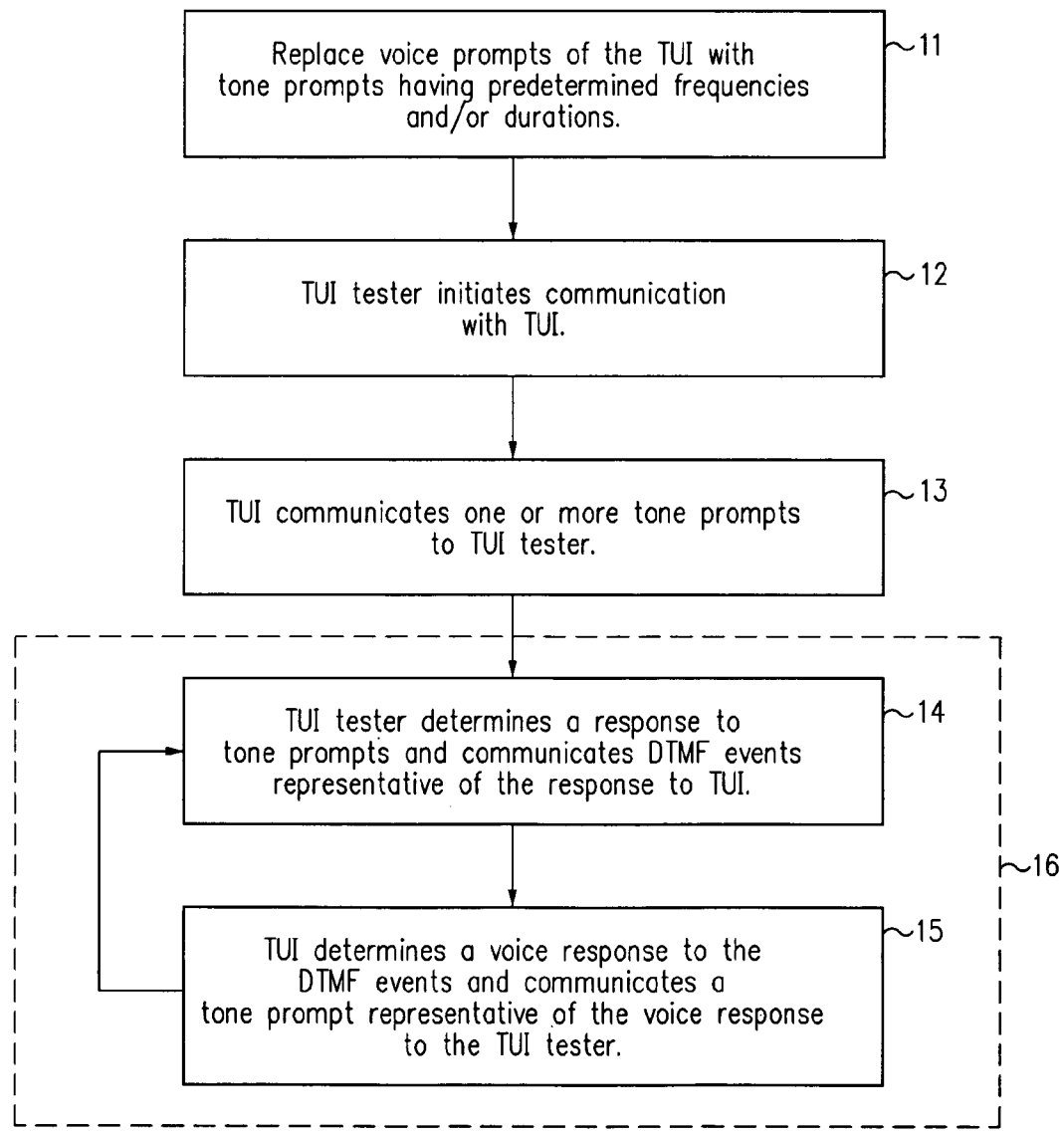
FIG. 1 is a flow chart showing the operation of a TUI test system, according to an exemplary embodiment of the present invention

Referring now to FIG. 1, the method of the present invention can comprise replacing the voice prompts of a TUI with tone prompts as indicated in block 11. Either all or some portion (that portion for which testing is desired) of the voice prompts can be replaced. The voice prompts can be replaced with tones having predetermined frequencies and durations. Steady state (unmodulated) continuous wave (CW) tones can be utilized. Alternatively, modulated tones can be used. In this manner, the tone prompts can be used to represent the voice prompts. The tone prompts are much easier to recognize and do not require the use of voice recognition.

The frequency alone can be used to determine which voice prompt a tone represents. That is, the duration can be the same for each tone and each tone is unmodulated. Alternatively, the duration of a tone can be used to determine which voice prompt the tone represents. As a further alternative, the tone can be modulated so as to determine which voice prompt it represents. Indeed, any desired combination of frequency, duration, and modulation can be used to determine which voice prompt a tone prompt represents.

For example, both the frequency and duration of each tone can be used to determine which message the tone represents. This may be useful, for instance, when varying the frequency alone does not provide enough tone prompts to represent all of the voice prompts. Varying both the frequency and duration of each the tone prompts will generally provided a sufficient number of combinations to uniquely represent all of the voice prompts of a contemporary voice mail system. The easiest way to determine the duration of a tone prompt is to use the duration of the original real voice prompt for the tone prompt as well.

Communication between the TUI tester and the TUI can be initiated by the TUI tester in the same manner that a user initiates communication with the TUI to retrieve voicemail messages, as indicated in block 12. Thus, the TUI tester can initiate communication with the TUI, such as by ringing the TUI.

The TUI then communicates one or more tone prompts t to the TUI tester, as indicated in block 13. This initial tone prompts can be representative of a voice prompt that asks the user (in this case, the TUI tester) to specify what action the TUI is to take. One example of such a voice prompt shown in block 41 of FIG. 4.

The TUI tester determines a response to the tone prompt (and consequently a response to the corresponding voice prompt) and communicates DTMF events to the TUI that are representative of the response, as indicated in block 14. Examples of such responses are shown in blocks 42-48 of FIG. 4.

The TUI then determines a voice response to the DTMF events and communicates one or more tone prompts representative of the voice response to the TUI tester, as indicated in block 15. Examples of such voice responses are shown in blocks 49-53 of FIG. 4.

The communication of DTMF events from the TUI tester and tone prompts from the TUI continue in a loop 16, as necessary in order to test all desired aspects of the TUI. For example, all of the voice prompt and DTMF combinations shown in FIG. 4 can be tested. In this manner, it can be determined whether or not the TUI responds properly to DTMF events from the TUI tester.

Figures 2, 3:
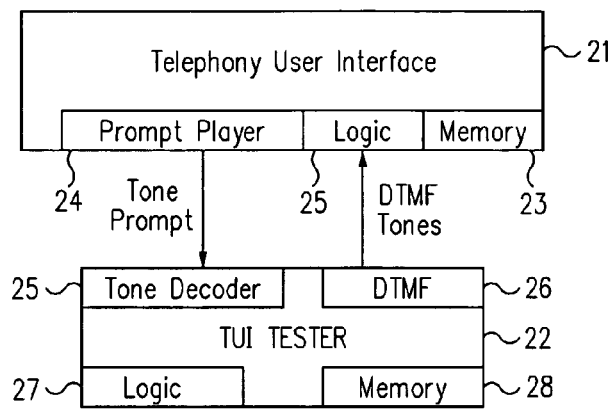
FIG. 2 is a block diagram showing a TUI in communication with a TUI tester during testing of the TUI, according to an exemplary embodiment of the present invention.
FIG. 3 is table showing representative voice prompts, as well as the corresponding frequencies and durations of tone prompts that can be substituted therefor, according to an exemplary embodiment of the present invention.

Referring now to FIG. 2, the TUI 21 can comprise a memory 23, a prompt player 24, and logic 25. Memory 23 can be used to store the tone prompts that replace the voice prompts. Memory 23 can be the same memory that stores the voice prompts or can be a different memory with respect thereto. Memory 23 can be disposed within TUI 21 or can be dispose external with respect thereto. Memory 23 can be a computer memory, such as a solid state memory or a disk memory. Examples of disk memories include hard disk drives, optical disk drives such as CD's and DVD's, and magneto-optical disk drives.

Either the tone prompts themselves or information representative thereof can be stored in the memory. For example, the tone prompts themselves can be stored as .wav or .mp3 files. Information representative of the tone prompts can be stored as midi files. Replacement of the voice prompts with the tone prompts can be effected by either a hardware switch, such as a jumper, of the TUI 21 or by software control, such as via TUI tester 22 or by just copying the tone prompts to memory 23 with same file names as that of original voice prompts.

Prompt Player 24 plays the tone prompts in response to logic 25. Thus, when logic 25 determines that a tone prompt should be sent to a TUI tester 22, then the tone prompt or information representative thereof is provided to prompt player 24. Prompt player 24 plays the desired tone prompt and the tone prompt is sent to TUI tester 22. Logic 25 determines what tone prompt is to be sent to prompt player 24, such as in response to received DTMF events.

TUI tester 22 can comprise a tone decoder 25, a DTMF generator 26, logic 27, and a memory 28. Tone decoder 25 decodes the tone prompts from TUI 21. DTMF generator 26 generates DTMF events that are sent to TUI 21. Logic 27 determines what DTMF events are to be sent from TUI tester 22 to TUI 21, such as in response to tone prompts. Memory 28 can contain instructions, such as software, which is used by logic 27.

TUI tester 22 can be embodied as a general purpose computer. Thus, Logic 27 can be a processor of a general purpose computer and memory 28 can be a memory thereof. In any instance, logic 27 determines the DTMF responses to the tone prompts, so as to facilitate testing of TUI 21. Logic 27 can also determine actions to be taken when an incorrect or unexpected event occurs during testing. For example, a report can be generated to provide details of the event. Such events include improper responses of TUI 21 to DTMF events from TUI tester 22.

Referring now to FIG. 3, some representative voice prompts, along with exemplary frequencies and durations of their corresponding tone prompts are provided. It is worthwhile to appreciate that any desired combination of frequency, duration, and/or modulation can be used to define tone prompts that replace voice prompts. Thus, the use of combined frequencies and durations as shown in FIG. 3 is by way of illustration only and not by way of limitation.

Figure 4:
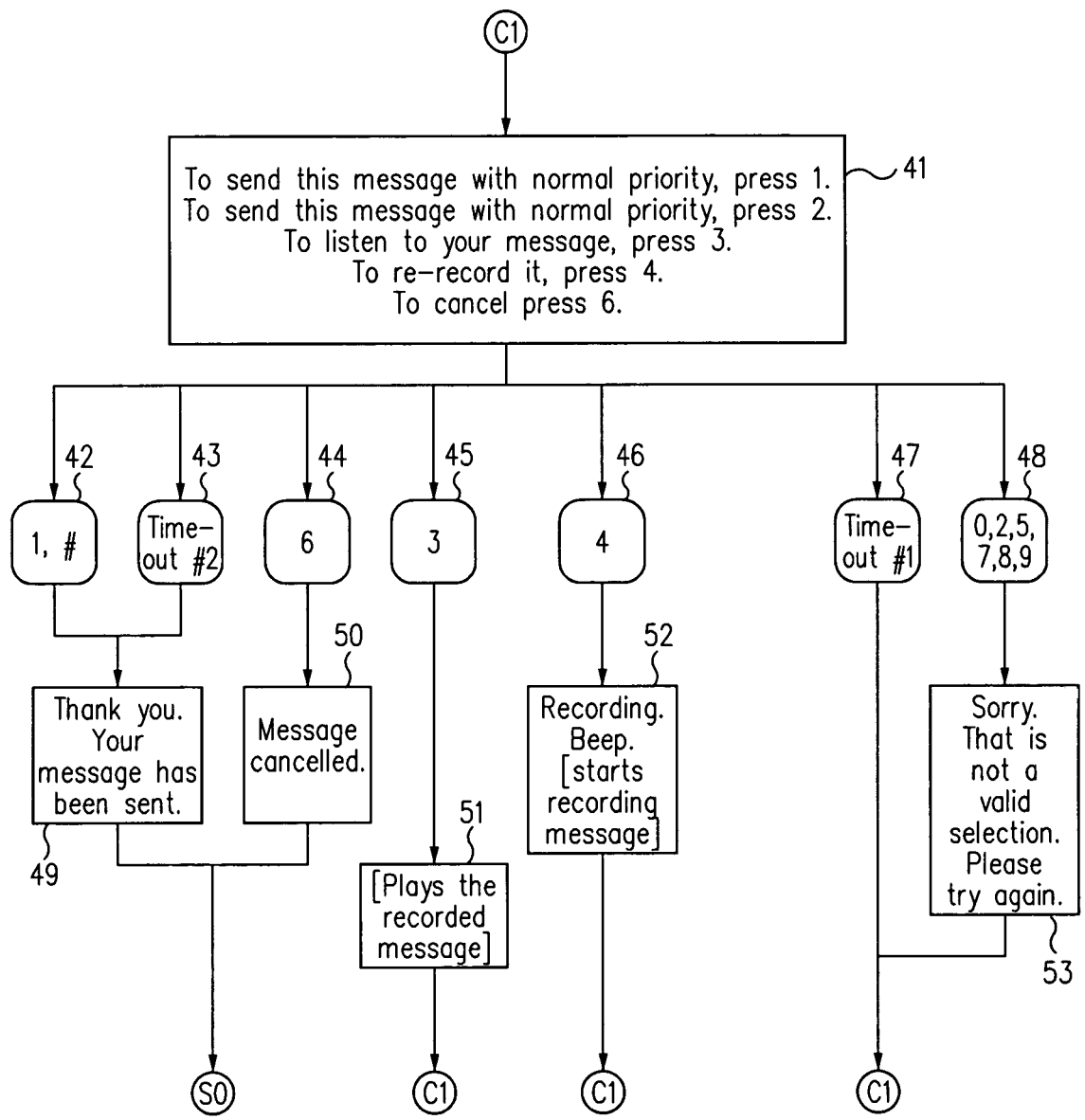
FIG. 4 is a flow chart showing representative voice prompts and DTMF responses.

Referring now to FIG. 4, an exemplary initial voice prompt 41 is provided by TUI 21. This initial voice prompt 41 may be provided in response to initialization of TUI 21, such as by transmitting a ring tone from TUI tester 22 to TUI 21. For testing purposes, other means of causing initial voice prompt 41 to be provided by TUI 21 may be used.

Blocks 42-48 show exemplary responses of TUI tester 22 to initial voice prompt 41. Responses include DTMF events representative of pressing keys on the keypad of a telephone, such as those responses shown in block 42, 44-46, and 48. These responses are provided by TUI tester 22 during testing of TUI 21. Timeouts, which occur when a key is not pressed in time, are shown in blocks 43 and 47.

Voice prompts provided by TUI 21 in response to the DTMF events and timeouts are shown in block 49-53. After the voice prompts shown in blocks 49 and 50, the tester can sign off, as indicated by the circled "SO". After the voice prompts indicted in blocks 51-53 and after the timeout indicated in block 47, the initial voice prompt shown in block 41 can be repeated, as indicated the circled "C1's". In this manner, all desired voice prompts (using the tone prompts substituted therefore) and DTMF events can be tested.

Thus, according to at least one aspect of the present invention, voice prompts such as those shown in blocks 41 and 49-53 are replaced with tone prompts. The tone prompts are sounds that can be recognized by TUI tester 22 as representing the voice prompts that they replace and thus eliminate the need for voice recognition by the TUI tester.

The method and system for automating the testing of TUI's of the present invention can be used for the testing of conventional public telephone switched network (PTSN), cellular, and other voicemail systems. The method and system of the present invention can also be used for the testing of IP based voicemail systems, such as those using VoIP via either an IP telephone or a computer. Also, the method can be used for testing hybrid voicemail systems that have both the regular PSTN interfaces and VoIP interfaces. The present invention provides an automated method and system for testing TUI's that is comparatively inexpensive, both financially and with respect to computational resources.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A method for testing a Telephony User Interface (TUI), the TUI using voice prompts to interact with a human user who responds to the voice prompts with DTMF messages, the method comprising:

initiating communication between the TUI and an automated TUI tester;

transmitting from the TUI to the automated TUI tester a first tone prompt in response to the initiation of communication, the first tone prompt replacing a first one of the voice prompts that would be transmitted to the human user;

interpreting at the automated TUI tester the first tone prompt as the replaced first voice prompt;

transmitting, from the automated TUI tester, to the TUI one of the DTMF messages in response to the first tone prompt interpretation such that the automated TUI tester responds to the TUI's first tone prompt as would the human user to the replaced first voice prompt.

2. The method as recited in claim 1, further comprising;
retrieving from a memory of the TUI the first tone prompt.

3. The method as recited in claim 1, wherein the first tone prompt comprises a predetermined frequency.

4. The method as recited in claim 1, wherein the first tone prompt comprises a predetermined duration.

5. A method for testing a Telephony User Interface (TUI), wherein the TUI interacts with a human user through a plurality of voice prompts, the human user responding to voice prompts with DTMF messages, the method comprising receiving at a TUI tester a sequence of the tone prompts from the TUI, each tone prompt in the sequence corresponding to selected ones of the voice prompts;

the TUI tester, interpreting as the human user would, the received tone prompts as the corresponding voice prompts; and from the TUI tester, transmitting to the TUI selected ones of the DTMF messages responsive to the interpretation of the received tone prompts as the corresponding voice prompts.

6. The method as recited in claim 5, wherein the tone prompts comprise tone prompts having a predetermined frequency.

7. The method as recited in claim 5, wherein the tone prompts comprise tone prompts having a predetermined duration.

8. The method as recited in claim 5, wherein the tone prompts comprise tone prompts having a predetermined frequency and a predetermined duration.

* * * * *